United States Patent
Carter et al.

(10) Patent No.: US 9,071,443 B2
(45) Date of Patent: Jun. 30, 2015

(54) AUTOMATED SERVICE PLATFORM PROSPECTING

(75) Inventors: Stephen R Carter, Spanish Fork, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 1616 days.

(21) Appl. No.: 12/197,833

(22) Filed: Aug. 25, 2008

(65) Prior Publication Data

US 2010/0050239 A1 Feb. 25, 2010

(51) Int. Cl.
*G06F 9/445* (2006.01)
*H04L 9/32* (2006.01)
*H04L 29/06* (2006.01)

(52) U.S. Cl.
CPC .......... *H04L 9/3263* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 6,757,262 B1 * | 6/2004 | Weisshaar et al. ............ 709/228 |
| 6,845,393 B1 | 1/2005 | Murphy et al. |
| 7,065,579 B2 | 6/2006 | Traversat et al. |
| 2005/0234873 A1 | 10/2005 | Milligan et al. |
| 2005/0276229 A1 | 12/2005 | Torabi |
| 2006/0161563 A1 | 7/2006 | Besbris et al. |
| 2007/0280230 A1 | 12/2007 | Park |

OTHER PUBLICATIONS

"Resources for Software as a Service (SaaS) and On-Demand Companies", http://www.opsource.net/saas-resources.php, (Downloaded Aug. 13, 2008).
"VMware VMsafe Security Technology", http://www.vmware.com/overview/security/vmsafe/security_technology.html, (2008).

* cited by examiner

*Primary Examiner* — Qamrun Nahar
(74) *Attorney, Agent, or Firm* — Schwegman Lundberg & Woessner, P.A.

(57) ABSTRACT

Techniques for automated service platform prospecting are provided. A prospector process is sent out in advance to scout for potential network sites that provide computing infrastructure and computing services (platforms) to self-contained computing environments. The prospector process validates the potential network sites for use and gathers site characteristics that are used to configure the self-contained computing environments when they are to be installed and executed on those network sites.

18 Claims, 4 Drawing Sheets

AUTOMATED SERVICE PLATFORM PROSPECTING

BACKGROUND

With the advent of high-density data centers and high-bandwidth networking, it is becoming increasingly desirable to provide services "in a cloud." This means that software is delivered to users as a service (referred to as Software as a Service "Saas") and the platform that the software executes on over the network is delievered as a service (referred to as Platform as a Service "PaaS").

Both SaaS and PaaS provide for computing and storage within "a cloud" where a user is not aware of the actual processing location or storage location of their service that processes over the network on that user's behalf.

Yet, while the actual location that a user's service processes is not particular interesting to the user and is in fact beneficially transparent to the user via the network cloud, the security associated with the location is a grave user concern. That is, it is critically important that the user know that any site over the network that processes the user's service conforms to certain guidelines and security restrictions so as to safeguard confidential data and ensure the integrity of the user's service when processing within the network cloud.

As a result, cloud discovery is not really an automated process for the user as it should be. This is so, because the user often has to know and has to certify specific locations within the network cloud before the user is comfortable with letting the user's service process from those network locations.

So, the technology (SaaS and PaaS) that was intended to be a huge leap forward in modern computing has in fact become a large manual administrative process, which actually impedes many of the benefits that are associated with SaaS and PaaS. Essentially, enterprises now find themselves establishing departments and staff that are solely dedicated to finding secure network locations for their applications.

Accordingly, improved techniques for automatically discovering and certifying application platforms are desirable.

SUMMARY

In various embodiments, techniques for automated service platform prospecting are presented. More specifically, and in an embodiment, a method for automated service platform discovery is provided. More specifically, a network site is identified; the network site provides computing services and platforms. A prospector process package is configured to inspect the network site. The prospector process package includes a prospector process and configuration details for installing and executing the prospector process on the network site. Next, a security certificate is acquired for the prospector process package, which permits the prospector process package to identify itself to and use the network site. Finally, the prospector process package is sent with the security certificate to the network site. The prospector process uses the security certificate to validate itself to the network site and to execute within the network site for purposes of gathering network site details for a subsequent platform process package, which installs and executes on the network site using its computing services and platforms.

DETAILED DESCRIPTION

A "resource" includes a service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers, secrets, and/or attributes that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger. In an embodiment, the identifier is a signature or a pair of signatures. For example, the signature of an identity service that vouches for a crafted identity, the signature of a principal associated with the crafted identity, or the signature of both the identity service and the principal.

"Authentication" is the process of validating the association of identifiers and secrets according to a policy, which is specific to the context in which the resulting identity is to be used. Thus, when identifiers are validated within a context specific to how an identity is to be used, it is authentication.

A "crafted identity" is an identity that may permit a principal's true identity to remain anonymous from the resource it seeks to access. With a crafted identity, an identity vault (e.g., one or more repositories holding secrets and identifiers) is opened to create the crafted identity and authenticate the principal to which it is associated, and then the identity vault is closed. Thereafter, the crafted identity can be validated by a resource, and acted upon without ever re-referencing the identity vault.

Example creation, maintenance, and use of crafted identities are discussed in U.S. patent Ser. No. 11/225,993 ("Crafted Identities"); commonly assigned to Novell, Inc. of Provo, Utah and the disclosure of which is incorporated by reference herein.

In some embodiments, an identity service is used. Examples of an identity service can be found in: U.S. patent Ser. No. 10/765,523 ("Techniques for Dynamically Establishing and Managing Authentication and Trust Relationships"), Ser. No. 10/767,884 ("Techniques for Establishing and Managing a Distributed Credential Store"), and Ser. No. 10/770,677 ("Techniques for Dynamically Establishing and Managing Trust Relationships"). These applications are also commonly assigned to Novell, Inc. of Provo, Utah and the disclosures of which are incorporated by reference herein.

A "payload platform package" refers to a self-contained environment that includes the necessary resources to process one or more applications or systems. A payload platform package is also associated with configuration data that permits the payload platform package to be instantiated on and processed on a target network site (device or set of devices—devices include computers, storage equipment, peripheral devices, etc.). The configuration data is dynamically modified to permit the payload platform package to be dynamically installed and processed on a particular target site. Some example payload platform package include, by way of example only, a zip file, a virtual machine (VM), an application environment or system environment, etc.

The phrase "prospector process package" refers to a special type of payload platform package that is designed to prospect a site for future use or to verify a site for immediate use by a particular payload platform package. The prospector process package is a self-instantiating and executing package that includes configuration settings to execute a prospector process and includes the storage mechanisms that the prospector process needs to execute on a site. The prospector process inspects a site and gathers configuration information and perhaps security information that can be stored and later used with a future payload platform package. The prospector process is also configured and enabled to communicate the network site configuration information, network site security information, network site details, and/or network site characteristics back to a recording service or Assay Office (discussed herein and below).

Also, the prospector process package is sent out, in some cases, in advance of an immediate payload platform package to verify a target site for immediate use of that payload platform package. Configuration information gathered about a site in advance of a payload platform package is later used to configure the payload platform package and permit it to install and execute on the site. Again, in some cases just before a payload platform package is sent to a target site a prospector process package and its prospector service can be sent out to verify the site for immediate use by the payload platform package.

The phrase "prospector process package" may be used interchangeably and synonymously herein with the term "prospector."

A "staging area" refers to a temporary network site for housing and evaluating the payload platform packages (including the prospector). Network site's (hosted by cloud service providers) that provide cloud services (computing platforms for use with self-contained processing environments and for use with stand-alone services) also include staging areas as generalization mechanisms that cloud service providers use to allow processing to be instantiated and executed in cloud service providers' computing infrastructure (computing environment).

The phrase "target site" may be used interchangeably and synonymously here with the phrase "hosting site." Additionally, in some instances a "staging area" or "staging site" is considered to be a type or target site.

An "Assay Office" is a special service located over the network that interacts with a prospector and a Prospector Manager (discussed below with reference to the FIGS. 1A and 1B) for purposes of validating sites for use with payload platform packages and for purposes of maintaining and managing configuration information (network site details) regarding sites that can potentially be used by payload platform packages. Specific processing associated with the Assay Office is discussed below with reference to the FIGS. 1B and 2.

As used herein the phrase "recording service" and "Assay Office" may be used interchangeably and synonymously.

In an embodiment, the network discussed herein may be a local area network (LAN (wired and/or wireless)), the Internet (wired and/or wireless), or any wide-area network (WAN (wired and/or wireless)).

Various embodiments of this invention can be implemented in existing network architectures. For example, in some embodiments, the techniques presented herein are implemented in whole or in part in the Novell® network, identity management, directory services, and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

It is within this context that embodiments of the invention are now discussed with reference to the FIGS. 1A-4 (5 total FIGS).

Figure 1A:
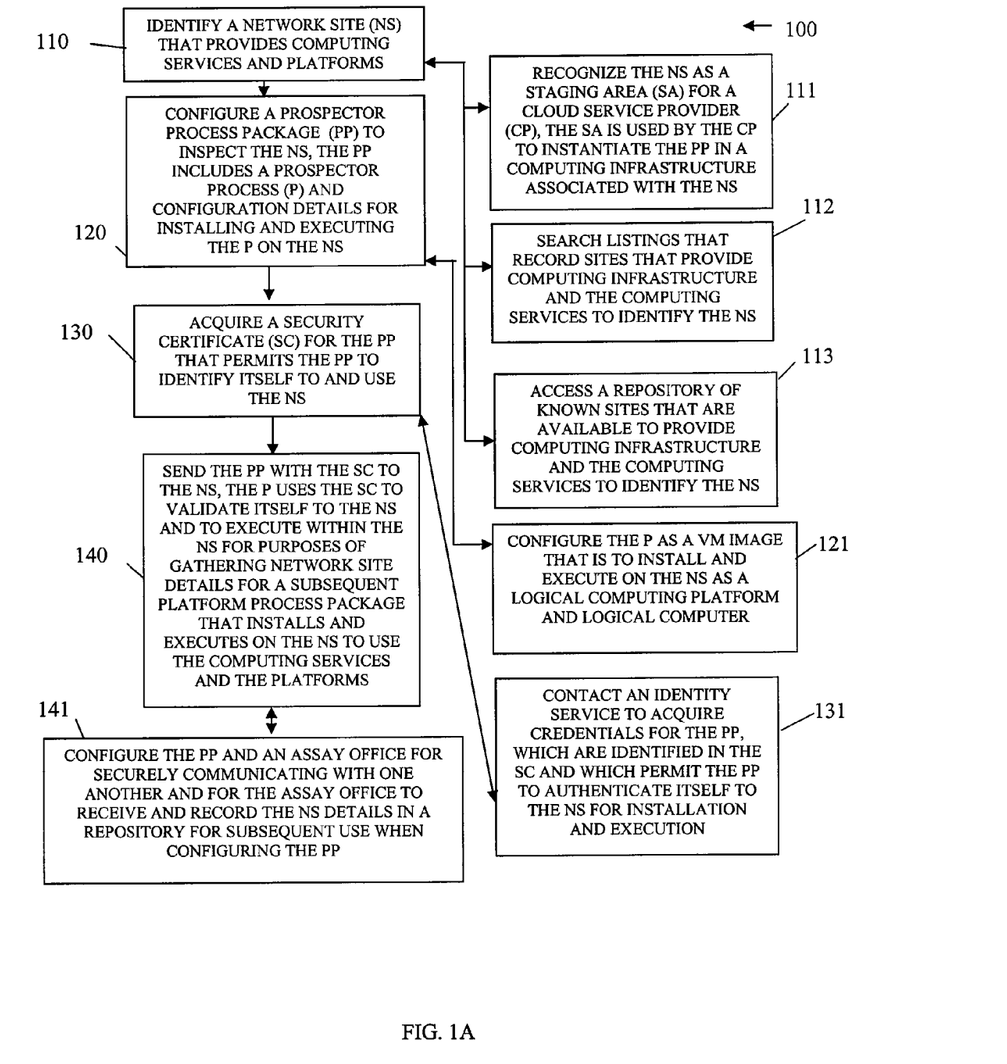
FIG. 1A is a diagram of a method for automated service platform discovery, according to an example embodiment.

FIG. 1A is a diagram of a method 100 for automated service platform discovery, according to an example embodiment. The method 100 (hereinafter "platform prospecting service") is implemented in a machine-accessible and readable medium. The platform prospecting service is also operational over a network and the network can be wired, wireless, or a combination of wired and wireless.

Figure 1B:
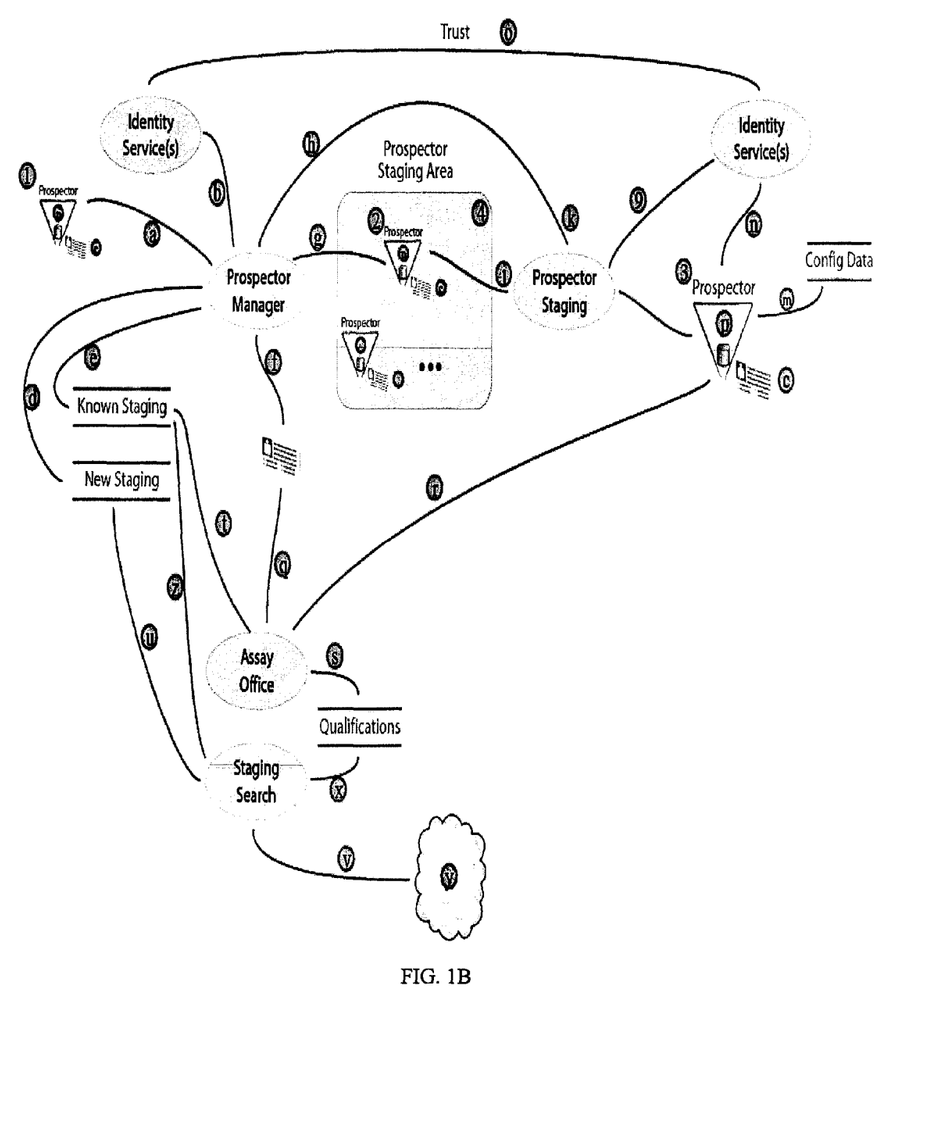
FIG. 1B is a diagram of an example architecture and its component interaction for implementing the method described with respect to the FIG. 1A.

The platform prospecting service automatically discovers network processing platforms and automatically and dynamically certifies and gathers configuration information for those discovered platforms for use by an enterprise's payload platform package as discussed in greater detail herein and below. Described later with reference to the FIG. 1B is an example architecture for providing automated platform prospecting, the platform prospecting service represents the Prospector Manager described in additional illustrative detail in that FIG. 1B below following the discussion of the FIG. 1A.

At 110, the platform prospecting service identifies a network site that provides computing services and computing platforms. This type of network site may also be referred to as a cloud service provider.

In an embodiment, at 111, the platform prospecting service recognizes the network site as a staging area for a cloud service provider. The staging area is used by the cloud service provider to instantiate a prospector process package (discussed below) in a computing infrastructure associated with the network site.

The network site can be identified or selected in a variety of manners.

For example, at 112, the platform prospecting service searches listings that record sites, which advertise as providing computing infrastructure, platforms, and services. The search is done for purposes of identifying the network site that is to be prospected.

In another case, at 113, the platform prospecting service accesses a repository of known sites, which are available to provide computing infrastructure, platforms, and services. Again, this is done for purposes of identifying the network site that is to be prospected.

At 120, the platform prospecting service configures a prospector process package to inspect or prospect the network site. The prospector process package includes a prospector process and configuration details for installing and executing the prospector process on the network site. The prospector process is designed to install and execute on the network site and gather network site details or characteristics (discussed below). This information can later be used to install a platform process package (discussed above).

According to an embodiment, at 121, the platform prospecting service configures the prospector process as a virtual machine (VM) image that is to install and execute on the network site as a logical computing platform and logical computer.

In an embodiment, at 130, the platform prospecting service acquires a security certificate for the prospector process package. The security certificate permits the prospector process package to authenticate to and be indentified by the network site.

Continuing with the embodiment of 130 and at 131, the platform prospecting service contacts an identity service to acquire credentials for the prospector process package. The credentials are identified in the security credential and this permits the prospector process package to authenticate itself to the network site for installation and execution. In some cases, the credential is used by the prospector process package while processing on the network site to contact and to authenticate to another different identity service from the one that supplies the initial certificate. That other identity service that the prospector process package authenticates to on the network site is in a trust relationship with the identity service that supplied the certificate to the platform prospecting service, such that the other identity service recognizes and authenticates the prospector process package. The other identity service is also used by the network site to assist in authenticating resources that install and process on the network site.

Examples of identity services were discussed above and incorporated by reference herein.

At 140, the platform prospecting service sends the prospector process package (and in some embodiments with the security certificate) to the network site. The prospector process (in some embodiments using the security certificate) validates itself (as discussed above) to the network sites (such as in one case via an identity service).

The prospector process, once authenticated, executes within the network site for purposes of gathering network site details or characteristics for a subsequent or future platform process package that subsequently installs and executes on the network site. That platform process package is a self contained computing processing environment that utilizes the computing services, infrastructure, and/or platforms of the network site.

In an embodiment, at 141, the platform prospecting service configures the prospector process package and an Assay Office (recording service and discussed below with reference to the FIGS. 1B, 2, and 3) for securely communicating with one another. This is also done so that the Assay Office can receive and record the network details and/or characteristics in a repository for subsequent use when configuring the platform process package.

It is noted that the actions of the platform prospecting service and the advance prospector service can be done to discover and qualify (certify) new potential network sites or can be done just (immediately in advance of or a configurable period of time) before a platform process package is to be installed on a particular site. This latter situation is done to ensure that there are no changes in the network characteristics or details for a particular network site when a platform process package wants to use that network site, since there may be some interval of elapsed time from when the network characteristics or details for the network site were certified and when the platform process package needs to use that network site and such that changes could have occurred.

FIG. 1B is a diagram of an example architecture and its component interaction for implementing the method described with respect to the FIG. 1A.

Some aspects of the architecture show the process related to the platform prospecting service discussed in detail above with reference to the method 100 of the FIG. 1A. Other aspects of the architecture show the process related to the platform discovery service discussed in detail below with reference to the method 200 of the FIG. 2. Still other aspects of the architecture show processes related to other components that can be used with automated platform discovery and validation.

It is noted that the description that follows is but one implemented and is presented for purposes of illustration and comprehension as other different architectures and components may be used without departing from the teachings presented herein above and below. It is within this context that the sample architecture and its component interaction are now discussed in detail.

The Prospector (three versions labeled as 1, 2, and 3 in FIG. 1B) is a Process Package meaning that the process and associated storage and configurations are packaged such that the package may be instantiated and executed on a processing site. In an embodiment, a process package is a VM. In another embodiment the process package may be a ZIP file.

A Staging Search mechanism performs a search of network resources "y" via "v" searching for service staging areas and resources that are not already noted in the Known Staging ("z") repository. Staging areas can be advertised themselves via listings in known locations or can be proactively found by crawling the network and searching for appropriate notices that cloud services (sites for platform installation) are available. Any staging areas that are found are qualified by comparing the site with the stipulations in Qualifications via "x" and, if qualified, added to New Staging via "u." In this manner, a list of qualified but as of yet untested staging areas is maintained. Qualifications are requirements that need to be met for the Prospector; these can be specific resources and/or specific security considerations, etc.

Both the Known Staging and New Staging lists are used by the Prospector Manager to test either an already known site for continued use or a new site for future use. The intent is to test a site claiming to provide cloud services to make sure that it provides the correct services and is not a site that can attempt to subvert cloud possessing or otherwise do malicious things to the services associated with the Prospector and/or do malicious things to a principal (user or automated service) that is sponsoring the Prospector.

The Prospector Manager prepares a Prospector (again—there are three renditions of the Prospector in the diagram, labeled 1, 2, and 3 in FIG. 1B) which is a processing image that can be hosted by a service provider (SP) that provides cloud processing. In an embodiment, the Prospector is a VM image.

The Prospector Manager configures the Prospector at "1" by setting the configuration information for the specific site that can be prospected and configures the Assay Office that can receive prospecting reports; the Prospect Manager also associates a short-lived certificate with "1" that was obtained from the Identity Service(s) via "b." Some example identity services that can be used were described and incorporated by reference above. In an embodiment, a part of the short-lived certificate is the public part of a key set generated by the Identity Service called PK1 (the two parts are referred to as PK1pub and PK1priv) and the public portion of a second key set generated by the Identity Service called PK2 (the two parts will be referred to as PK2pub and PK2priv).

The short-lived certificate, PK1, and PK2 are made available to the Assay Office that "1" communicates with via "f". There is a 1:1 relationship between any specific Prospector and the associated short-lived certificate, PK1, and PK2.

The Prospector Manager now selects the site to be prospected from Known Staging (or, in an embodiment this was selected previously and included in the configuration data for the Prospector and, in an embodiment, the short-lived certificate).

The Prospector Manager places the fully configured and packaged Prospector in the Prospector Staging Area via "g," or via "h" if there is a more direct method (e.g., a paid subscription for the Prospector).

The Prospector Staging Area is presented as a generalization of mechanisms that cloud service providers can use to allow processing to be instantiated in the cloud service infrastructure. The Prospector Manager maintains the presence of "2" in the Prospector Staging Area by placing it there and removing it when the short-lived certificate expires or when an event indicates that the "2" should be removed. Since the Prospector Staging Area is a generalization, it is possible that there are many Prospectors in the Prospector Staging Area organized in various manners. The embodiments of the invention are not concerned with this organization, only with the fact that the mechanism "g" provides for correctly adding "2" to the Prospector Staging Area.

The Prospector Staging mechanism verifies the short-lived credential received via "j" or "k" via "9" with the Identity Service. This verification allows the hosting site or cloud service provider to verify that the "3" is coming from a source that is either trusted or has a subscription or as the rights necessary to run in the hosting center for some reason. This may be done via "o" or some other mechanism (e.g., digital signature verification).

The Prospector "3" obtains the hosting site's Config Data to obtain Internet Protocol (IP) addresses, Domain Name System (DNS) addresses, gateway addresses, metadata for Identity Services, etc. via "m."

The Prospector "3" interacts with the Identity Service(s) via "n" to establish trust and to obtain any identity tokens needed to operate in the hosting site.

The Prospector "3" interacts with the assigned Assay Office via "r." In an embodiment, Secure Sockets Layer (SSL) or Transport Layer Security (TLS) is used for "r" in another embodiment PK1pub or PK2pub is used to secure "r."

The Assay Office obtains the keys and credential via "q" and verifies that the credentials have not expired. If they are not expired, then the Assay Office receives information from the Prospector "3" to report on the services available and the infrastructure deployment. In an embodiment, the Assay Office may send additional requests for information that the Prospector "3" was not originally set up to provide.

The Assay Office verifies all "r" via "s" to determine the validity of the hosting site. If the Qualifications are met, then the site is added to Known Staging via "t."

In this manner a list of Known Staging sites may be maintained. In an embodiment, a list need not be maintained at all; rather, each time that a processing task is to be sent to a hosting site, a Prospector is sent first to verify the hosting site's operational and deployment characteristics. Only if the site qualifies is the platform process package then sent to the hosting site.

Note shown in the diagram FIG. 1B is a mechanism that the Assay Office invokes when a site is qualified for addition to the Known Staging list. In an embodiment, the new mechanism (Annotate Known Staging) gathers information from the Prospector certificates and configuration along with information gleaned from the Prospector ("r") and constructs annotations to the Known Staging entry for the site, such that future configurations of Prospectors or other process packages that are to be run on the site are more complete because any specific needs that the site has can be handled immediately.

Figure 2:
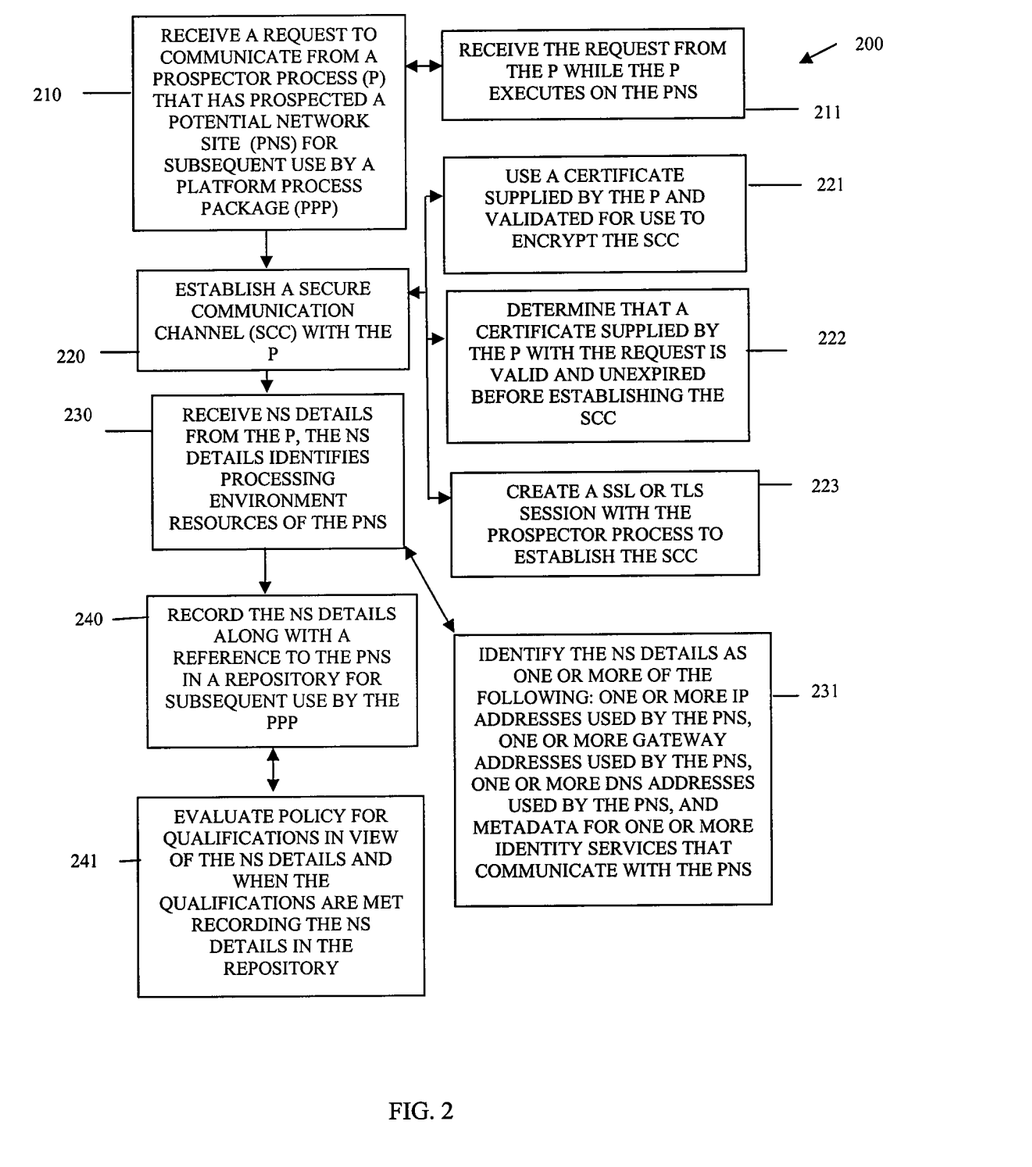
FIG. 2 is a diagram of another method for automated service platform discovery recordation service, according to an example embodiment.

FIG. 2 is a diagram of another method 200 for automated service platform discovery recordation service, according to an example embodiment. The method 200 (hereinafter "platform recordation service") is implemented in a machine-accessible and readable medium. The platform recordation service is operational over a network. The network may be wired, wireless, or a combination of wired and wireless.

The platform recordation service represents another aspect or component that interacts with the platform prospecting service represented by the method 100 of the FIG. 1A. Specifically, the platform recordation service is described from the point of view of the Assay Office discussed above with reference to the FIG. 1B.

At 210, the platform recordation service receives a request to communicate. This request is received from a prospector process (discussed above), which has or is prospecting a potential network site for subsequent use (delayed or immediate) by a platform process package.

According to an embodiment, the platform recordation service receives the request form the prospector process while the prospector process is executing on the potential network site. Thus, the request is received dynamically and in real time from the prospector process.

At 220, the platform recordation service establishes a secure communication channel with the prospector process. This can be done in a variety of manners.

For example, at 221, the platform recordation service can use a certificate supplied by the prospector process. That certificate is validated for use and used to encrypt the secure communication channel.

In another case, at 222, the platform recordation service determines that a certificate supplied by the prospector process with the request is in fact valid and unexpired before the platform recordation service decides to establish the secure communication channel.

In yet another situation, at 223, the platform recordation service creates a secure socket layer (SSL) or transport security layer (TLS) session with the prospector process to establish the secure communication channel.

At 230, the platform recordation service receives network site details from the prospector process over the secure communication channel. The network site details or network site characteristics identify the processing environment resources and configuration settings of the potential network site. The network site details or characteristics can include a variety of information.

By way of example only, at 231, the platform recordation service identifies the network site details as one or more of the following items: one or more Internet Protocol (IP) addresses used by the potential network site, one or more gateway addresses used by the potential network site, one or more domain name system addresses used by the potential network site, and/or metadata for one or more identity services that communicate with the potential network service, etc.

At 240, the platform recordation service records the network site details along with a reference to the potential network site in a repository for subsequent use by the platform process package.

In an embodiment, at 241, the platform recordation service evaluates policy for qualifications of the potential network site in view of or in response to the network details supplied by the prospector process. When the qualifications are met, the platform recordation service records the network site details in the repository. So, the platform recordation service can perform one or more additional checks and in response to those checks decide whether the potential network site qualifies to be included as a site for future use and if does qualify then the network site details are recorded in a repository of known sites that can be used by the platform process package.

Figure 3:
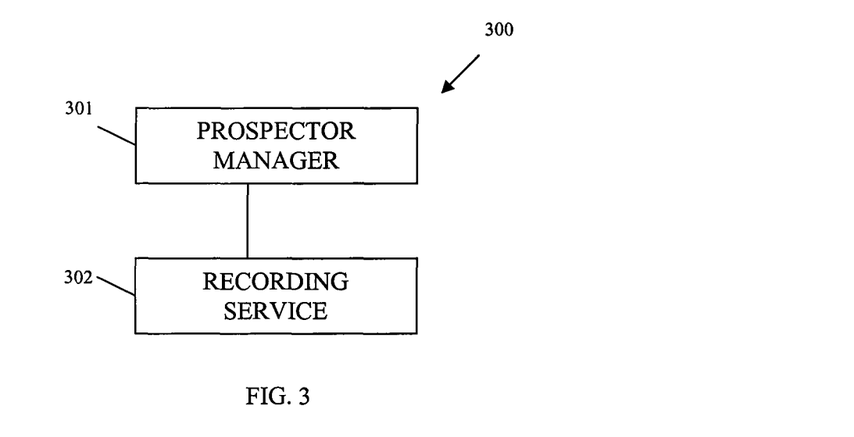
FIG. 3 is a diagram of service platform discovery system, according to an example embodiment.

FIG. 3 is a diagram of service platform discovery system 300, according to an example embodiment. The service platform discovery system 300 is implemented in a machine-accessible and computer-readable storage medium and is operational over a network and processes on one or more machines (computers or processor-enabled devices) of the network. The network may be wired, wireless, or a combination of wired and wireless. In an embodiment, the service platform discovery system 300 implements among other things the platform prospecting service represented by the method 100 of FIG. 1A and the platform discovery recordation service represented by the method 200 of the FIG. 2.

The service platform discovery system 300 includes a prospector manager 301 and recording service 302. Each of these will now be discussed in turn.

The prospector manager 301 is implemented in a computer-readable storage medium and processes on a machine (processor-enabled device, computer, etc.) of the network. Example processing associated with the prospector manager 301 was presented in detail above with reference to the FIGS. 1 and 1A.

The prospector manager 301 is to configure a prospector process package for installation and execution on a network site. The network site provides computing services and infrastructure to a platform process package. Again, the platform process package defines its own processing environment within the infrastructure of the network site.

A prospector process, which is included in the prospector process package, gathers site details for the network site and also securely communicates those network site details to the recording service 302.

The prospector manager 301 subsequent uses the recording service to acquire the network site details for purposes of later configuring the platform process package when the platform process package is to be installed and executed on the network site.

In an embodiment, the prospector manager 301 interacts with the recording service 302 to initially identify the network site for prospecting by the prospector process.

In another case, the prospector manager 301 supplies credentials to the prospector process package for purposes of authenticating the prospector process package to the network site and for purposes of authenticating the prospector process for interacting with the recording service 302 for supplying the network site details.

According to an embodiment, the prospector manager 301 puts or places the prospector process package in a staging area of the network site prior to the prospector process package installing and executing on the network site along with a temporary certificate. Also, the prospector manager 301 can remove the prospector process package from the staging area when the temporary certificate expires or when an event is detected, which indicates that the prospector process package is to be removed from the staging area.

The recording service 302 is implemented in a computer-readable storage medium and is to process on a machine of the network. Example processing associated with the recording service 302 was presented in detail above with reference to the FIGS. 1B and 2.

The recording service 302 provides a variety of features that were discussed above, such as identifying network sites for prospecting and interacting with the prospector process to qualify or certify particular network sites for future use by platform process packages. Other features of the recording service 302 were presented above with reference to the FIGS. 1B and 2.

Figure 4:
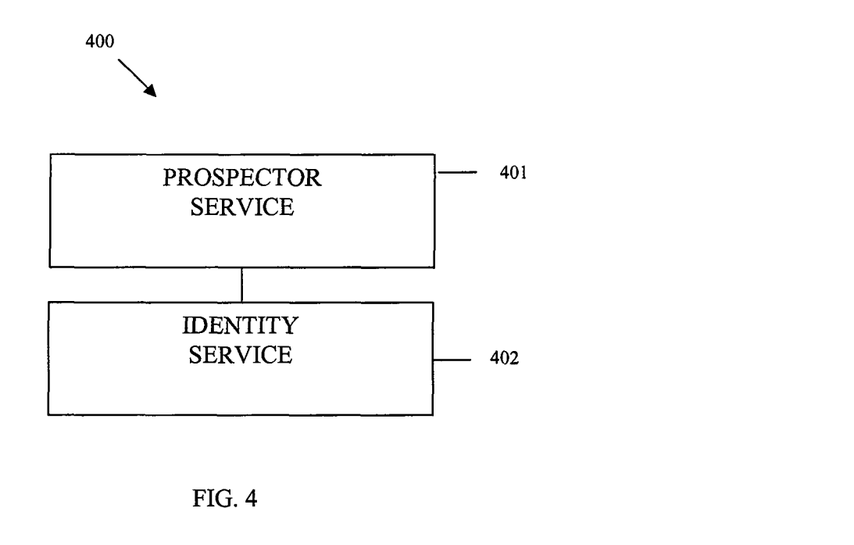
FIG. 4 is a diagram of another service platform discovery system, according to an example embodiment.

FIG. 4 is a diagram of another service platform discovery system 400, according to an example embodiment. The service platform discovery system 400 is implemented in a machine-accessible and computer-readable storage medium and is to be processed by machines (computers or processor-enabled devices) over a network. The network may be wired, wireless, or a combination of wired and wireless. In an embodiment, the service platform discovery system 400 performs, among other things, the processing associated with the method 100 of the FIG. 1A; performs the processing associated with the method 200 of the FIG. 2; and presents another perspective and in some ways enhanced perspective to the system 300 of the FIG. 3.

The service platform discovery system 400 includes a prospector service 401 and an identity service 402. Each of these will now be discussed in turn.

The prospector service 401 is implemented in a computer-readable storage medium and is to process on a machine (e.g. computer, etc.) of the network. Example aspects of the prospector service 401 were described in detail above with reference to the FIGS. 1A, 1B, 2, and 3. These aspects were presented with reference to the term prospector and the phrase prospector process.

The prospector service 401 installs itself on a network site that provides computing infrastructure and services to a platform process package. Moreover, the prospector service 401 authenticates itself to the network site via the identity service 402. Once the prospector service 401 successfully executes on the network site, the prospector service 402 gathers network site details for the network site that can be used to configure the platform process package for subsequent installation and execution on that network site.

In an embodiment, the prospector service 401 uses the identity service 402 or a different identity service to establish a secure communication with a recording service (such as the recording services of the FIGS. 2 and 3). During the secure communication, the prospector service 401 communicates the network site details to the recording service for subsequent use in configuring a platform process package for installation and execution on the network site.

According to an embodiment, the network site is a prior site that was used by the platform process package and the prospector service 401 and the prospector service 401 is sent out in advance of the platform process package to ensure that there are no changed network details that deviate from the network site details gathered by the prospector process 401. In another case, the prospector service 401 is sent to revalidate the network site details and this can occur even when there is not an imminent platform process package that needs to use the network site.

In another case, the network site is a potential network site that has advertised itself as providing the computing infrastructure and the computing services. Also, in this case the network site has not been used by the platform process package before.

In yet another situation, the network itself is actively mined to discover the network site in response to qualifications that have to be met for potential network sites to house the platform process package. The prospector service 401 is configured to prospect the discovered network site for the network site details when those qualifications are met.

The identity service 402 is implemented in a computer-readable storage medium and is to process on a machine of the network. The identity service 402 is a modified version of the identity services discussed and incorporated by reference herein and above. Example interactions and features of the identity service 402 were provided above with reference to each of the preceding figures.

The identity service 402 provides credentials, certificates, and authentication services to the prospector manager (discussed above), the prospector service 401, and the network sites being prospected.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   identifying a network site that provides computing services and/or platforms;
   configuring a prospector process package to inspect the network site, wherein the prospector process package includes a prospector process and configuration details for dynamically installing and executing the prospector process on the network site, the prospector process package is a self-contained computing processing environment that utilizes computing services, infrastructure, and platforms of the network site when installed; and
   sending the prospector process package to the network site, wherein the prospector process validates itself to the network site executes within the network site for purposes of gathering network site details for a subsequent platform process package that dynamically installs and executes on the network site to use the computing services and the platforms, and the prospector process makes a determination as to whether the subsequent platform process package can install and utilize the network site, the prospector process package is sent to the network site a configurable period of time before the subsequent platform process package dynamically installs and executes on the network site to ensure no changes have taken place on the network site before the platform process package installs.

2. The method of claim 1, wherein identifying further includes recognizing the network site as a staging area for a cloud service provider, the staging area is used by the cloud service provider to instantiate the prospector process package in a computing infrastructure associated with the network site.

3. The method of claim 1, wherein identifying further includes searching listings that record sites that provide computing infrastructure and the computing services to identify the network site.

4. The method of claim 1, wherein identifying further includes accessing a repository of known sites that are available to provide computing infrastructure and the computing services to identify the network site.

5. The method of claim 1, wherein configuring further includes configuring the prospector process as a virtual machine image that is to install and execute on the network site as a logical computing platform and logical computer.

6. The method of claim 1 further comprising:
   acquiring a security certificate for the prospector process package that permits the prospector process package to identify itself to and use the network site and sending the security certificate with the prospector process package to the network site, wherein acquiring further includes contacting an identity service to acquire credentials tier the prospector process package, which are identified in the security certificate and which permit the prospector process package to authenticate itself to the network site for installation and execution.

7. The method of claim 1, wherein sending further includes configuring the prospector process package and an assay office for securely communicating with one another and for the assay office to receive and record the network site details in a repository for subsequent use when configuring the platform process package.

8. A machine-implemented system, comprising:
   a network having a prospector manager (PM) implemented in a non-transitory computer-readable storage medium and to process on the network; and
   the network also having a recording service implemented in a non-transitory computer-readable storage medium and to process on the network;
   wherein the PM is to configure a prospector process package for dynamic installation and execution on a network site, the prospector process package is a self-contained computing processing environment that utilizes computing services, infrastructure, and platforms of the network site when dynamically installed, the network site providing the computing services and the infrastructure to a platform process package that defines its own processing environment within the infrastructure of the network site, and wherein a prospector process of the prospector process package gathers network site details for the network site and securely communicates those network site details to the recording service, and wherein the PM subsequently uses the recording service to acquire the network site details to configure the platform process package when the platform process package is to be dynamically installed and executed on the network site, the prospector process is sent to the network site a configurable period of time before the platform process package dynamically installs and executes on the network site to ensure no changes have taken place on the network site before the platform process package dynamically installs, and the prospector process makes a determination as to whether the platform process package can install and utilize the network site.

9. The system of claim 8, wherein the PM interacts with the recording service to initially identify the network site for prospecting by the prospector process.

10. The system of claim 8, wherein PM supplies credentials to the prospector process package to authenticate to the network site and to authenticate and interact with the recording service.

11. The system of claim 8, wherein the PM uses the recording service to ensure qualifications are met before the PM selects the network site for prospecting by the prospector process.

12. The system of claim 8, wherein the PM puts the prospector process package in a staging area of the network site prior to the prospector process package installing and executing on the network site along with a temporary certificate.

13. The system of claim 12, wherein the PM removes the prospector process package from the staging area when the temporary certificate expires or when an event is detected indicating that the prospector process package is to be removed from the staging area.

14. A machine-implemented system comprising:
a network having a prospector service implemented in a non-transitory computer-readable storage medium and to process on the network; and
the network also having an identity service implemented in a non-transitory computer-readable storage medium and to process on the network;
wherein the prospector service dynamically installs itself on a network site that provides computing infrastructure and services to a platform process package and the prospector service authenticates itself to the network site via the identity service once the prospector service successfully executes on the network site, the prospector process package is a self-contained computing processing environment that utilizes the computing services, the infrastructure, and the platform of the network site when dynamically installed, and the prospector service gathers network site details for the network site that can be used to configure the platform process package for subsequent dynamic installation and execution on that network site, the prospector process is sent to the network site a configurable period of time before the platform process package dynamically installs and executes on the network site to ensure no changes have taken place on the network site before the platform process package dynamically installs and the prospector process makes a determination as to whether the platform process package can install and utilize the network site.

15. The system of claim 14, wherein the network site is a prior site that was used by the platform process package and the prospector service is sent out in advance of the platform process package to ensure that there are no changed network site details that deviate from the network details gathered by the prospector service or the prospector service is sent out to revalidate the network site details.

16. The system of claim 14, wherein the network site is a potential network site that has advertised itself as providing the computing infrastructure and the computing services and wherein the network site has not been used by the platform process package before.

17. The system of claim 14, wherein the network is actively mined to discover the network site in response to qualifications that have to be met for potential network sites to house the platform process package, and wherein the prospector service is configured to prospect the discovered network site tier the network site details when those qualifications are met.

18. The system of claim 14, wherein the prospector service uses the identity service or a different identity service to establishing a secure communication with a recording service, and wherein during the secure communication the prospector service communicates the network site details to the recording service for subsequent use in configuring the platform process package for installation and execution on the network site.

* * * * *